April 7, 1959  A. C. KNIPE  2,880,549
APPARATUS FOR SOILLESS CULTIVATION, PARTICULARLY GRAVEL CULTURE
Filed Feb. 19, 1957  4 Sheets-Sheet 1
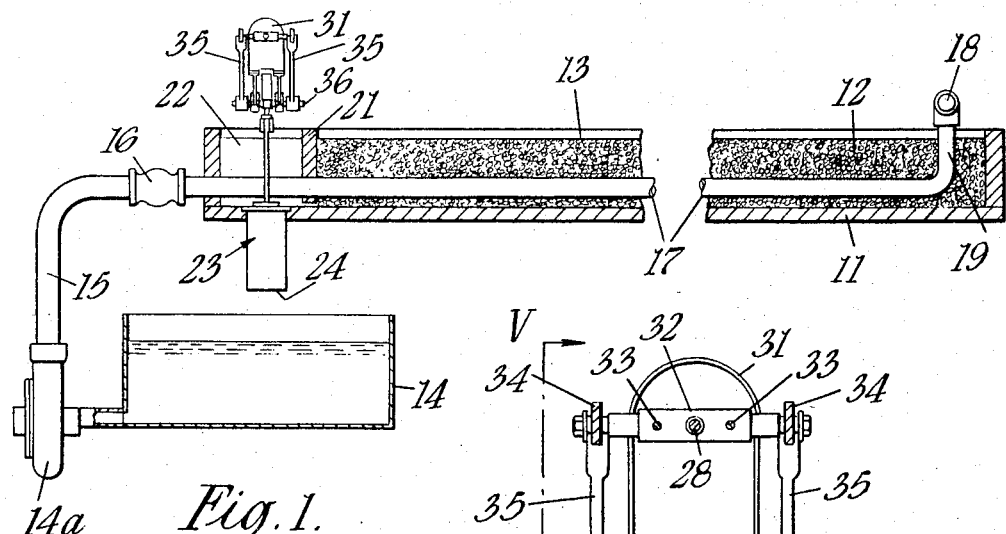
Fig. 1.
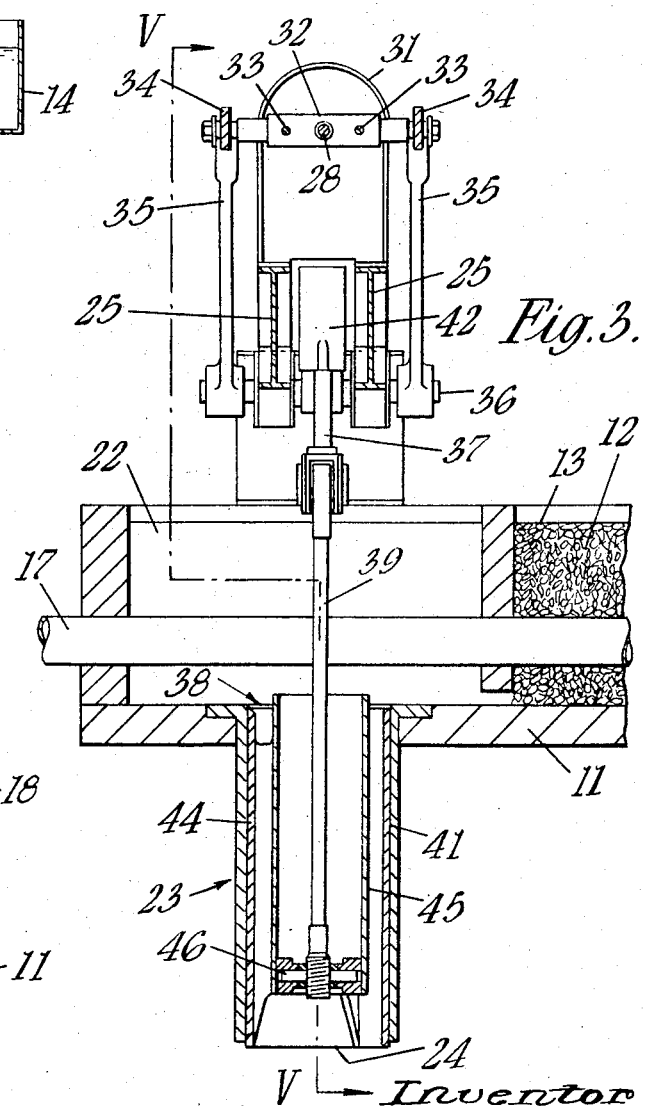
Fig. 2.
Fig. 3.
Inventor
A. C. Knipe
By Glascock Downing Seebold
Attys.

April 7, 1959
A. C. KNIPE
2,880,549
APPARATUS FOR SOILLESS CULTIVATION, PARTICULARLY GRAVEL CULTURE
Filed Feb. 19, 1957
4 Sheets-Sheet 2
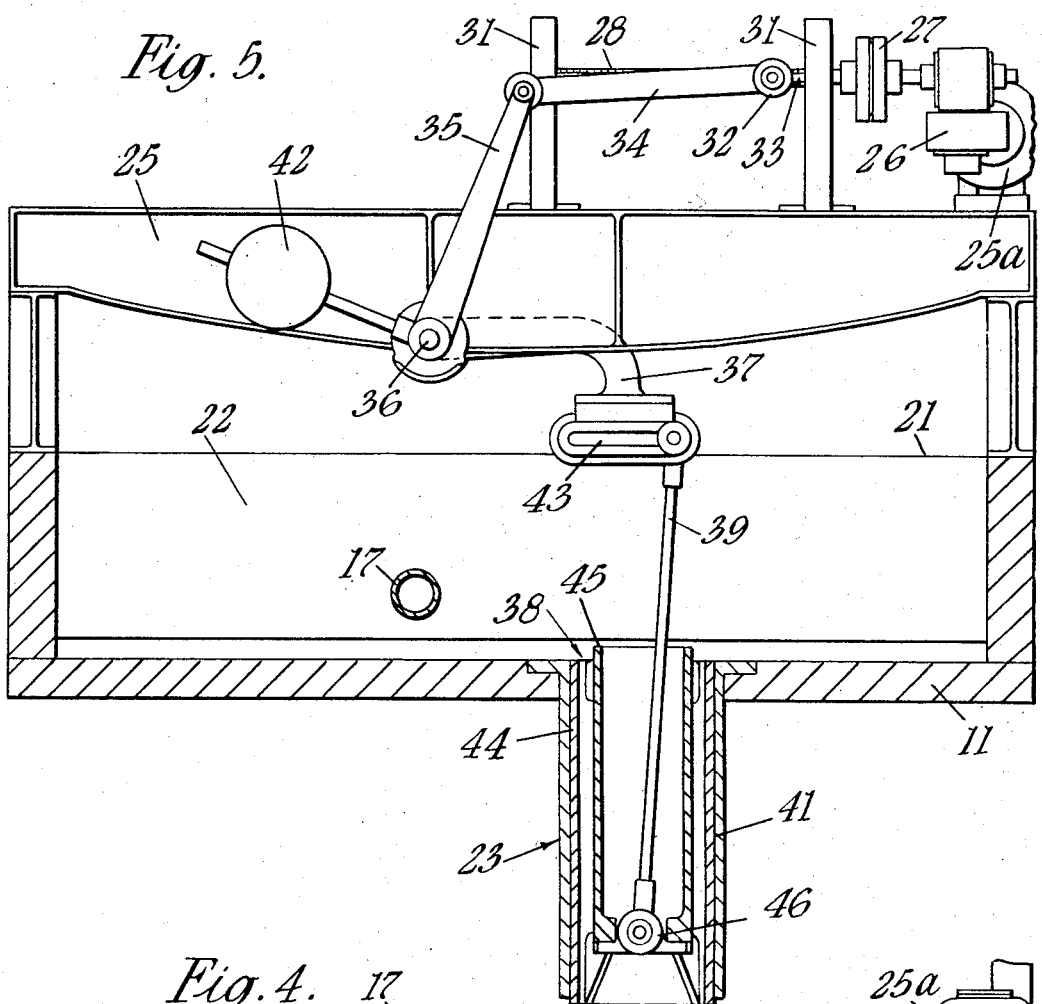
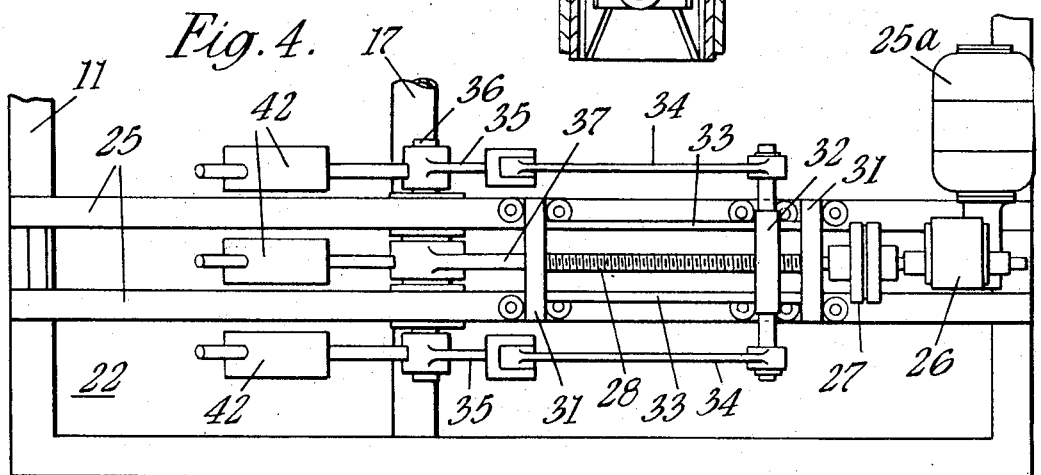

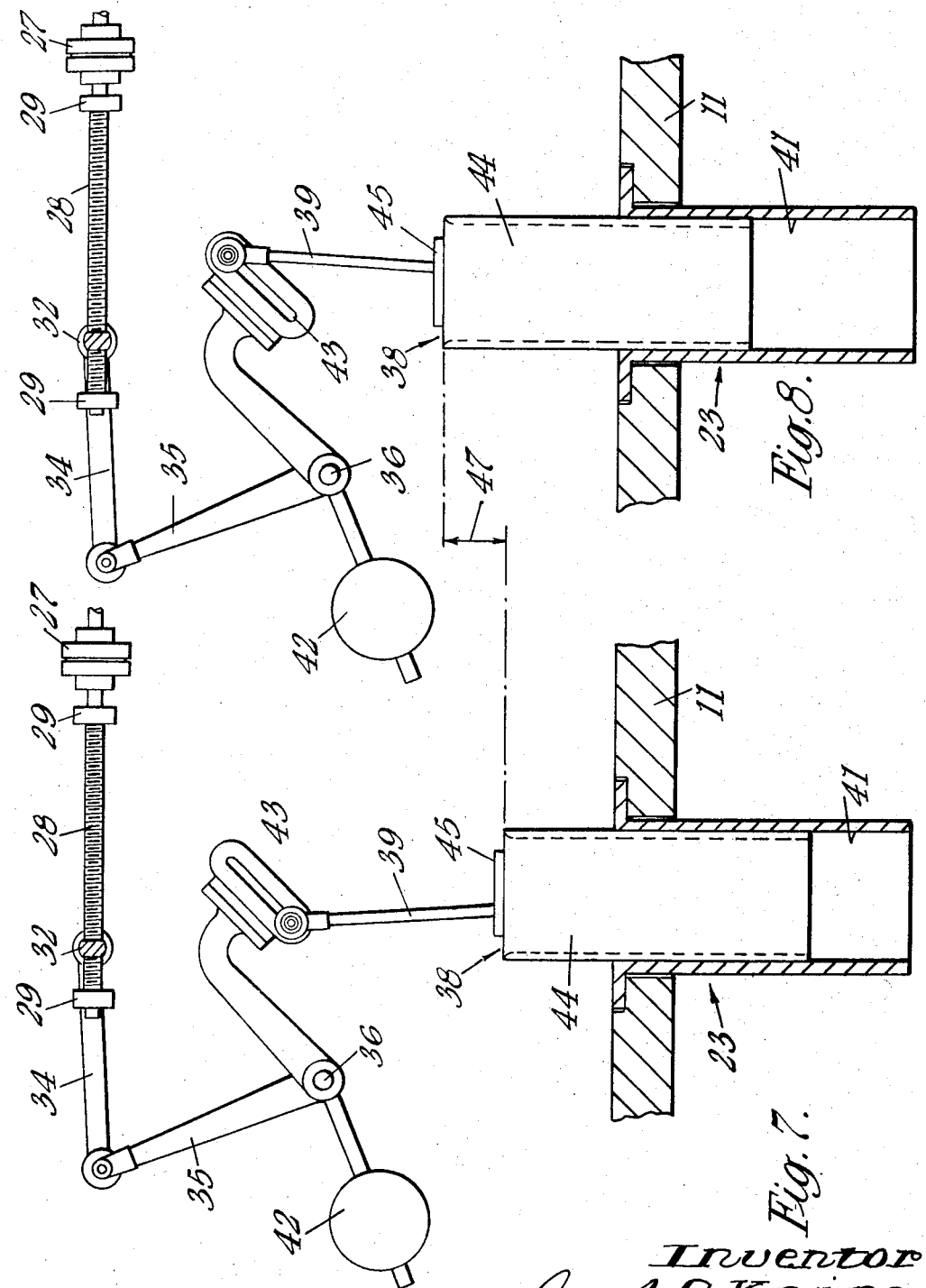

United States Patent Office 2,880,549
Patented Apr. 7, 1959

2,880,549

APPARATUS FOR SOILLESS CULTIVATION, PARTICULARLY GRAVEL CULTURE

Arthur Cyril Knipe, London, England

Application February 19, 1957, Serial No. 641,116

Claims priority, application Great Britain February 20, 1956

5 Claims. (Cl. 47—38)

The present invention relates to soilless cultivation, particularly to installations in which plants are grown in an inert bed, such as gravel, coarse sand, cinders or similar material. This bed is contained in a trough, which may be of timber, metal or concrete of any convenient width, comparatively shallow, probably not more than seven inches in depth and of a length which may reach 50 feet or more.

The plants are fed by inundating the roots with suitable nutrient solutions, which are pumped into the trough at intervals up to a predetermined level and then drained back from an outlet in the bottom of the trough to an adjacent storage tank.

The inundation of the bed should take place slowly, half an hour being a suitable time, whilst the draining time should certainly not be less and, in a long bath, should be considerably more; the object being to draw the air down after the receiving liquid, to aerate the roots of the plants.

It is an object of the invention to provide a means of controlling the rate of filling the trough, independent of the rate of supply which the feed pump provides.

Another object is to provide a means of controlling the depth to which the trough is filled.

A further object is to provide a means of ensuring that the time allowed for filling, or partly filling the trough remains constant and is independent of the particular level to which the plant roots are being inundated.

It is a still further object of the invention to ensure that during draining the water level falls evenly over the whole area of the trough, thus ensuring even aeration at the plant roots, which aeration is not easily effected when the trough is drained from the bottom as the receding liquid flows in the local channels where the voids are greatest to the detriment of areas where the proportion of voids is lower.

The invention consists of the provision of a depth control means in the form of a weir, which may be of any convenient type, which weir is used to control the rate at which the inundation takes place and the height to which it is pumped in the trough, independent of the capacity of the pump.

The invention further provides for the control of the emptying of the trough at the end of the inundation period by lowering the weir and leaving the nutrient solution to drain away over the receding weir. As a result, the drainage takes place from the top of the water level, which falls evenly over the whole area of the trough, enabling the air to be drawn down evenly after the receding liquid, which ensures more even aeration of the roots of the plants, which is of the utmost importance. It should be borne in mind that the inundation and draining takes place very slowly, the filling and draining cycle taking an hour or more.

The invention will be further described with reference to the accompanying drawings wherein:

Figure 1 is a diagrammatic longitudinal vertical section of an embodiment of the invention, Figure 2 is a plan view of the right hand end of Figure 1, Figure 3 is a detail view of the left hand end of the trough shown in Figure 1, Figure 4 is a plan view of the apparatus shown in Figure 3, Figure 5 is a section on the line V—V of Figure 3

Figures 7 and 8 show views similar to Figure 6 in the opposite extreme position, illustrating vertical adjustment of the depth control.

Figure 6:
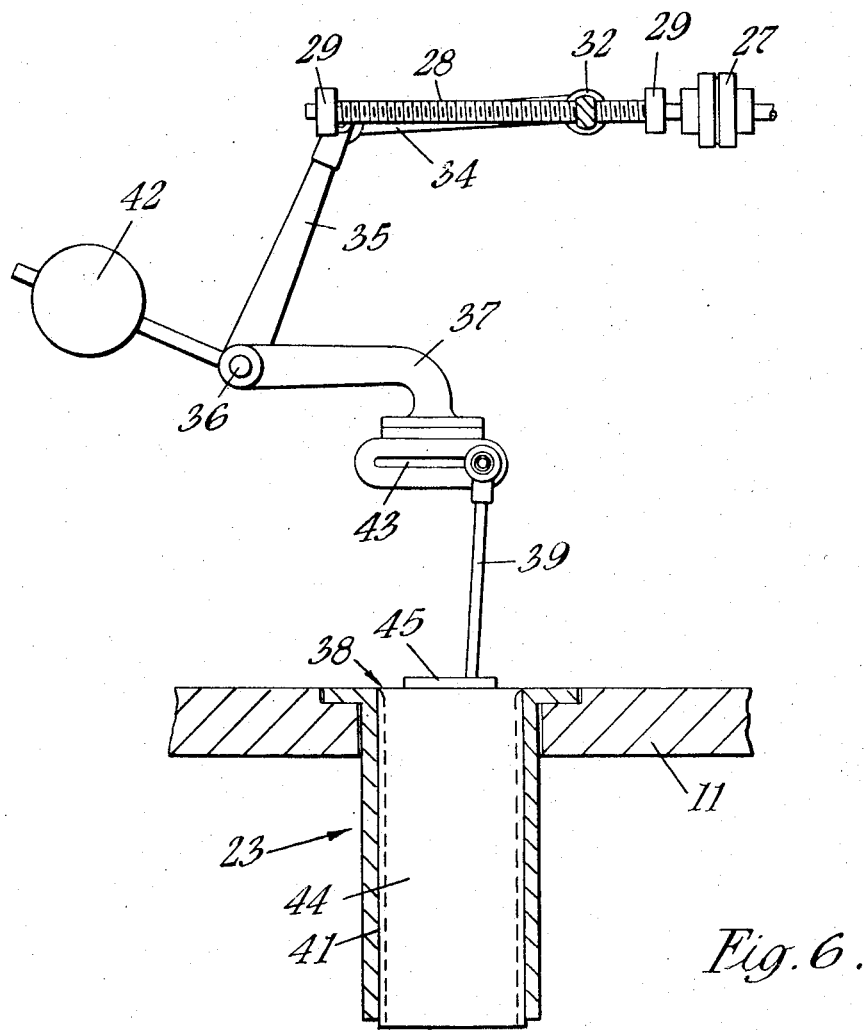
Figure 6 is a diagrammatic view of certain parts shown in Figure 5 in an extreme position.

Referring first to Figure 1, reference numeral 11 denotes generally a trough of extended length and filled with gravel 12 up to a level 13. Nutrient solution is stored in a tank 14 and which is connected through pump 14a over conduit 15, non-return valve 16 and conduit 17 with perforated delivery pipe 18 which feeds the solution into the gravel from above the level 13. When using a long, e.g. over twenty feet in length, trough it is necessary to perforate the horizontal portion of the conduit 17 throughout its length, following conventional practice, in order to secure sufficiently uniform inundation of the trough. In such a case vertical portion 19 and delivery pipe 18 may be omitted. It is this which renders the presence of non-return valve 16 necessary to prevent draining of the nutrient solution through the pump 14a when the same is not working, i.e. during the draining period. It will be understood therefore that when working with a short trough, say less than twenty feet, the liquid is fed solely from above the level 13, and non-return valve 16 may be omitted.

A partition 21 is provided adjacent one end of the trough 11 to prevent the gravel 12 from being carried into the discharge chamber 22 which connects with the depth control 23 and outlet 24 to be further described hereinafter.

Referring now to Figures 3 to 5, there is shown a bridge, consisting of two members 25 suitably braced together, spanning one end of the trough and forming a platform on which the operating mechanism is mounted. A fractional horse power motor 25a combined with a reduction gear 26 provides the motive power which is transmitted through a flexible coupling 27 to the driving shaft 28. This driving shaft 28 is mounted on ball bearings 29 (indicated in Figures 6 to 8) carried in two frames 31 which are secured to the bridge formed by members 25. Between these two frames 31 the shaft 28 has a screw thread (which may be in the region of 20 threads per inch).

Shaft 28 carries a nut 32 which converts the rotary movement of the shaft to a straight line movement of the nut.

The nut 32 is supported on two guide rods 33 which are themselves supported between the frames 31. The nut 32 slides backwards and forwards on the guide rods 33 being driven by the screw on shaft 28, the extent of the travel being controlled by limit switches (not shown) which stop the motor and reverse the electric circuit ready for the return journey.

On an extension piece on the nut 32 outside the guide rods 33, a connection is made through a ball bearing to couplers 34 which operate levers 35 mounted on a shaft 36 which transmits the motion to a final lever 37, which lever raises and lowers the tubular weir 38 through the connecting rod 39, the weir 38 being sealingly slidable in its guide 41.

Balance weights 42 are provided to reduce the load on the motor. In practice, they are arranged so that they just lift the weir 38, which reduces the starting current necessary. The top end of the connecting rod 39 has a ball bearing which is carried on a bolt secured by a wing nut, which bolt may slide in the slot 43 on lever 37 and may be fastened by securing the wing nut.

The weir 38 itself consists of a tube 44 supported vertically in the guide 41 and operated by the mechanism referred to above, the guide tube may be open at the bottom where it discharges into the tank 14 in which the nutrient solution is stored and from which the pump 14a takes its supply. An inner tube 45 is provided in the weir, which protects the bottom bearing 46 of the connecting rod 39 from the nutrient solution.

The pump 14a consists of an electrically driven pump which follows conventional lines, with the exception that its capacity is only slightly in excess of what is required to fill the voids in the trough as the weir rises.

To put the apparatus into operation at the required intervals, a 24 hour "Venner" type switching clock is employed which is used to start the pump and lifting mechanism.

On starting the pump the solution is pumped over conduit 15, non-return valve 16, conduit 17 and out through delivery pipe 18 or the perforations, if such exist, in conduit 17. Simultaneously with the starting of the pump 14a, motor 25a is started and through reduction gear 26, flexible coupling 29, threaded shaft 28, nut 32, lever 34 and lever 35 rotates shaft 36 at the required low angular velocity so that lever 37 goes from the position shown in Figure 6 to that shown in Figure 8 in the requisite inundation period of half an hour or more. The speed of shaft 28 is of the order of two revolutions per minute. The inundation period may be varied either by varying the speed of the motor 25a or by varying any of the speed reduction mechanism. Alternatively the positions of the limit switches may be varied but this affects the height to which the weir is raised.

The arrangement for varying the height to which the weir is raised, independently of the positions of the limit switches and hence the inundation period, consists of the slot 43 on lever 37 and its associated bolt and wing nut on connecting rod 39, and is illustrated in Figures 6 to 8.

Figure 6 shows the weir in its lowermost position with the bolt in a position to give the highest uppermost position available, as in Figure 8. Figure 7 illustrates the effect of shifting this bolt to the left to give a lower maximum height of weir and hence depth of solution in the bed. The chain dotted comparison line between Figures 7 and 8 and arrow 47 illustrates the differences in weir height which may be obtained by these means.

The instantaneous height of the top of the weir tube fixes an instantaneous maximum depth of liquid in the bed, any excess over this depth draining way between the inside of tube 44 and the outside of tube 45. As the weir rises so the depth of liquid in the bed rises, since the pump has a capacity slightly in excess of that demanded to fill the voids in the bed of gravel as the weir rises.

When nut 32 reaches the limit switches corresponding to the upper limit of the weir motion and operates it, pump 14a is stopped and motor 25a reversed so that the weir commences its return journey and the trough is progressively drained. During the draining period the speed of shaft 28 may be reduced so that the draining period is longer than the inundation period to ensure sufficient aeration of the bed. On nut 32 reaching the limit switch corresponding to the lowermost position of the weir the motor 25a is stopped and the apparatus is then once more under the control of the 24 hour switching clock which is arranged so that a further inundation draining cycle is initiated after a lapse of some hours.

The clock cannot be used for stopping as it is not possible to ensure the times taken lifting and lowering the weir are exactly the same, as a very slight variation would result in the mechanism jamming.

It will be understood that various modifications and changes may be made within the spirit and scope of the invention as defined in the appended claims.

What is claimed is:

1. A trough adapted for use in growing plants in an inert bed by intermittently inundating the bed with a nutrient liquid and allowing the liquid to drain away, having an outlet for the liquid controlled by a weir, said weir comprising a tube substantially sealingly reciprocable through the floor of the trough in a generally vertical direction, the interior of the tube being connected to said outlet whereby the maximum depth of liquid in the trough may be varied by reciprocation of the tube.

2. A trough as claimed in claim 1 in which the mechanism for raising and lowering the tube comprises a connecting rod pivotally mounted within the tube and extending generally vertically therefrom, lever means adapted to rotate through a limited arc, said lever means having a slot therein extending generally horizontally in the position corresponding to the lowermost position of the tube, the said connecting rod being adjustably connectable to said slot so that the lowermost position of the tube is substantially the same for all positions of the rod in the slot and the raised positions vary according to the relative placement of the rod and the slot.

3. A trough adapted for use in growing plants in an inert bed by intermittently inundating the bed with a nutrient liquid and allowing the liquid to drain away, comprising pumping means for inundating the bed, weir means controlling the depth of liquid in the trough, means to reciprocate said weir means between a lowermost position, corresponding to a drained trough, and an uppermost position corresponding to an inundated trough, and means controlling the pumping means and the reciprocating means whereby the weir means is rising slowly while the pumping means is inundating the bed and subsequently descending slowly to allow the liquid to drain away thereover at a controlled rate.

4. A trough adapted for use in growing plants in an inert bed by intermittently inundating the bed with a nutrient liquid and allowing the liquid to drain away, comprising a weir, means for inundating the trough to a level determined by the position of said weir and means for slowly lowering said weir whereby the liquid is allowed to drain away in the weir and the level of liquid in the bed is gradually reduced.

5. A trough for use in growing plants in an inert bed by intermittently inundating the bed with a nutrient liquid and allowing the liquid to drain away, comprising depth controlling means for the liquid in the trough, and means for reciprocating said depth controlling means, in a predetermined period, from a lowermost position, corresponding with a drained trough, to an uppermost position, corresponding to a trough inundated to a prescribed level, and back to said lowermost position, said means for reciprocating the depth controlling means comprising a connecting rod attached to said depth control means and lever means adapted to rotate through a limited arc, said lever means having a slot therein extending generally horizontally in the position corresponding to the lowermost position of the depth control means, the said connecting rod being adjustably connectable to said slot so that the lowermost position of the depth control means is substantially the same for all positions of the rod in the slot and the uppermost position may vary according to the relative placement of the rod and the slot.

References Cited in the file of this patent

UNITED STATES PATENTS

| | | |
|---|---|---|
| 1,172,833 | Ricker | Feb. 22, 1916 |
| 1,222,648 | Marks | Apr. 17, 1917 |

(Other references on following page)

UNITED STATES PATENTS

| | | |
|---|---|---|
| 2,060,735 | Krueger | Nov. 10, 1936 |
| 2,152,254 | Hansen | Mar. 28, 1939 |

FOREIGN PATENTS

| | | |
|---|---|---|
| 478,403 | Great Britain | Jan. 18, 1938 |
| 65,836 | Norway | Mar. 1, 1943 |

OTHER REFERENCES

Publication: "Soilless Growth of Plants" (Ellis et al.), second edition, published by Reinhold (N.Y.), 1947. Pages 90-93, 105-11 are relied upon.